(12) United States Patent
Inaba

(10) Patent No.: US 6,305,135 B1
(45) Date of Patent: Oct. 23, 2001

(54) COMPOSITE BUILDING MATERIAL AND METHOD FOR MANUFACTURING THE SAME

(75) Inventor: Hiroshi Inaba, Hokkaido (JP)

(73) Assignee: Yoshiki Kimura (JP)

( * ) Notice: Subject to any disclaimer, the term of this patent is extended or adjusted under 35 U.S.C. 154(b) by 0 days.

(21) Appl. No.: 09/311,233

(22) Filed: May 13, 1999

(30) Foreign Application Priority Data

May 14, 1998 (JP) .................................................. 10-150740

(51) Int. Cl.$^7$ ....................................................... E04B 1/41
(52) U.S. Cl. .................................... 52/309.12; 52/309.17; 52/342; 52/612; 52/590.1
(58) Field of Search ........................... 52/309.12, 309.17, 52/612, 590.1, 342, 343

(56) References Cited

FOREIGN PATENT DOCUMENTS

| 5510720 | 1/1980 | (JP) | ................................. | B32B/5/18 |
| 55126416 | 9/1980 | (JP) | ................................. | E04C/2/30 |
| 5761861 | 12/1982 | (JP) | ................................. | E04C/2/26 |
| 58166419 | 11/1983 | (JP) | ................................. | B32B/5/18 |
| 5943124 | 3/1984 | (JP) | ................................. | B32B/5/18 |
| 06033531 | 2/1994 | (JP) | ................................. | E04B/2/86 |
| 07269060 | 10/1995 | (JP) | ................................. | E04F/13/04 |
| 07300965 | 11/1995 | (JP) | ................................. | E04F/13/04 |

Primary Examiner—Beth A. Stephan
Assistant Examiner—Phi Dieu Tran A
(74) Attorney, Agent, or Firm—Schwegan, Lundberg, Woessner & Kluth, P.A.

(57) ABSTRACT

Provided is a composite building material which is more improved in the bonding capability of a cement mortar material itself with a foamed synthetic resin plate layer, furthermore prevents the occurrences of exfoliations and cracks and has higher strength compared with conventional composite materials. Plural concave grooves are formed in parallel on at least one of the surface and backface of a foamed synthetic resin plate layer and a net-like groove lathing material corresponding to the size of each groove is arranged within each groove. A cement mortar material is filled in the groove so as to bury the groove lathing material, a net-like surface lathing material is then stretched over all of one surface and a cement mortar material is further laminated to form a composite building material in which the foamed synthetic resin plate layer and the cement mortar layer are integrated with each other. The groove is made concavely in almost a dovetail groove form and the composite building material is structured so as to dispose the groove lathing material in the back section of the groove.

19 Claims, 7 Drawing Sheets

COMPOSITE BUILDING MATERIAL AND METHOD FOR MANUFACTURING THE SAME

BACKGROUND OF THE INVENTION

1. Field of the Invention

The present invention relates to a composite building material manufactured by combining, for instance, a foamed synthetic resin material with a concrete material or with a reinforcing material and also to a method for manufacturing the composite building material, the composite building material ensuring that floor materials, framework walls and the like in, for instance, various buildings, e.g., general houses and residences, can be formed firmly in a simple and speedy manner.

2. Description of the Related Art

In customary production of this type of composite building material, for instance, when a cement mortar material is bonded with, for example, a flat plate-like foamed polystyrene board which is a heat-insulating material made of a foamed synthetic resin material, both materials are bonded with each other either by the adhesion of the cement mortar material itself or by using an adhesive thereby integrating the foamed polystyrene board with the cement mortar material. The adhesive include resin-soluble types and resin-insoluble types in which a synthetic rubber powder is compounded.

However, in the prior art, when the foamed synthetic resin plate layer is bonded with the cement mortar material only by the adhesion of the cement mortar material itself, both materials are easily separated from each other to produce cracks on account of very week adhesion, bringing about defects in strength for building materials. On the other hand, when the adhesive is used, the adhesive durability is reduced due to the deterioration of the adhesive itself caused by, for instance, a variation in the elastic modulus with time and denaturing of the composition and hence there is a possibility of exfoliations. Also, when the aforementioned resin-soluble adhesive is used, it solves part of the foamed synthetic resin plate layer, whereby clearances are produced between the foamed synthetic resin plate layer and the cement mortar layer and nonuniformity in the thickness of the foamed synthetic resin plate layer is caused. This is the cause of cracks and exfoliations. The aforementioned resin-insoluble adhesive formulated with a synthetic rubber powder is very expensive and hence the use of the resin for composite building materials is not very practical. Moreover, because the conventional composite building material using a foamed synthetic resin material is not provided with any reinforcing treatment for preventing buckling against bending stress, it has inferior strength particularly when it is used as a floor material and is not used very widely as framework wall materials for composite building materials.

SUMMARY OF THE INVENTION

The present invention has been made in view of such a situation as stated above and has an object of providing a composite building material which is produced without using an adhesive like the conventional processes, can prevent the occurrences of exfoliations and cracks by improving the adhesion of a cement mortar material itself to a foamed synthetic resin plate layer, has high strength, forms floor materials, framework walls and the like firmly, simply and speedily and has a resistance to buckling caused by bending stress to the composite building materials whereby it is improved in the strength, for instance when it is used for floor materials, framework walls or the like. The present invention also has an object of providing a method for the production of the composite building material.

In order to attain the above object, a composite building material according to the present invention comprises a foamed synthetic resin plate layer 2 formed with plural concave grooves 6 (9) on at least one of the surface and the backface thereof, a net-like groove lathing material 3 which is disposed in each inside of the grooves 6, a net-like surface lathing material 4 stretched on all of one surface such that it covers an opening of each groove 6 (9) and a cement mortar layer 5 laminated so as to bury both of the lathing materials 3 and 4.

The plural grooves 6 and 9 of the foamed synthetic resin plate layer 2 may be formed concavely on both surfaces of the foamed synthetic resign plate layer such that the groove 6 formed on one of the surfaces and the groove 9 formed on another of the surfaces have openings with widths different from each other and are arranged alternately in parallel such that they 6,9 do not oppose to each other.

The grooves 6 and 10 of the foamed synthetic resinplate layer 2 may be arranged so as to cross lengthwise and breadth wise.

The grooves 6 and 9 of the foamed synthetic resin plate layer 2 may be made concavely in the form of almost a dovetail groove type, almost an inverse T-shaped type or almost an inverse V-shaped type and the groove lathing material 3 is arranged in each back section of the grooves 6 and 9. Alternatively, the grooves 6 and 9 of the foamed synthetic resin plate layer 2 may be made concavely in almost a sectionally circular form and the groove lathing material 3 is arranged almost cylindrically along the circumferential wall of the grooves 6 and 9.

In the surface opposite to the one surface provided with the grooves 6, plural reinforcing materials 8 made of wood, concrete panel materials, rigid materials, iron materials, corrugated board materials or the like may be buried in opposition to each groove 6 such that each of these reinforcing materials is included or one of its surfaces is exposed.

In the foamed synthetic resin plate layer 2 constituting the composite building material 1, plural lengthy and narrow plate reinforcing materials 28 made of wood, concrete panel materials, rigid materials, iron materials, corrugated board materials or the like may be buried such that the reinforcing material is included or at least one of its surfaces is exposed.

At least one of the surfaces of the foamed synthetic resin plate layer 2 may be provided with a plywood layer 21 made of wood, concrete panel materials, rigid materials, iron materials, corrugated board materials or the like.

In a method for manufacturing a composite material according to the present invention,plural concave grooves 6 (9) are formed in parallel on at least one of the surface and the backface of a foamed synthetic resin plate layer 2 constituting a composite building material 1. After a net-like groove lathing material 3 corresponding to the size of each groove is arranged in each groove 6 (9) and a cement mortar material is then filled so as to bury the groove lathing material 3, a net-like surface lathing material 4 is stretched over all of one surface such that it covers an opening of each groove 6 (9) and a cement mortar material is also laminated. Alternatively, after a net-like groove lathing material 3 is arranged in each groove 6 (9) and a net - like surface lathing material 4 is stretched over all of one surface such that it covers an opening of each groove 6, a cement mortar material is filled such that both of the lathing materials 3 and 4 are buried and a concrete material layer 11 is laminated, thereby integrating the foamed synthetic resin plate layer with the cement mortar material.

Plural reinforcing materials 28 which are made in the form of a lengthy and narrow plate and made of wood, concrete panel materials, rigid materials, iron materials, corrugated board materials or the like and a lengthy and rectangular prismatic foamed synthetic resin material are applied alternately and integrated to form a plate.

Plural reinforcing materials 28 which are made in the form of a lengthy and narrow plate and made of wood, concrete panel materials, rigid materials, iron materials, corrugated board materials or the like may be buried in a foamed synthetic resign plate layer such that the reinforcing materials are included or one of the surfaces of each reinforcing material is exposed.

A plywood layer 21 made of wood, concrete panel materials, rigid materials, iron materials, corrugated board materials or the like is applied onto at least one of the surfaces of the foamed synthetic resin plate layer thereby integrating the both.

In the composite building material having the aforementioned structure according to the present invention, the lathing material 3 arranged in each of plural grooves 6 and 9 which are made in a concave form in parallel in the surface of the foamed synthetic resin plate layer 2 functions as an inner reinforcement supporting the entire cement mortar layer 5 in the grooves 6 and 9 to improve the adhesion between the foamed synthetic resin plate layer 2 and the cement mortar layer 5 through the grooves 6 and 9 thereby preventing exfoliations and cracks of the cement mortar layer 5.

The grooves 6 and 9 of the foamed synthetic resin plate layer 2, which grooves are made concavely in the form of almost a dovetail groove type, inverse T-shaped type or inverse V-shaped type or in almost a sectionally circular form, serve to firm the biting holding power of the cement mortar layer 5 against the foamed synthetic resinplate layer 2 through the groove lathing material 3 and are made to work for preventing disconnection caused by the peeling force of the cement mortar layer 5 thereby firmly uniting the cement mortar layers 5, formed in the grooves 6 and 9 and on the foamed synthetic resin plate layer 2, with each other. This results in no occurrence of cracks on the surface of the cement mortar layer 5 and keeps beautiful appearance of the surface of the building material.

The plural reinforcing materials 8 made of wood, concrete panel materials, rigid materials, iron materials, corrugated board materials or the like which reinforcing materials are buried in opposition to each groove 6 such that each of these reinforcing materials is included or one of its surfaces is exposed makes it possible to prevent the foamed synthetic resin plate layer 2 and the cement mortar layer 5 from being deformed by buckling caused by bending stress given to the composite building material 1.

The reinforcing material 28 made of wood, concrete panel materials, rigid materials, iron materials, corrugated board materials or the like which is buried such that the reinforcing material is included or at least one of its surfaces is exposed and the plywood layer 21 made of wood, concrete panel materials, rigid materials, iron materials, corrugated board materials or the like which is applied to one of the surfaces of the foamed resin plate layer 2 prevent buckling caused by bending stress given to the composite building material 1 when the composite building material is used as floor materials or the like and improve the strength In the method for manufacturing the composite building material according to the present invention, in turn, the composite building material 1 to be used as, for instance, floor materials or framework wall materials can be produced firmly, simply and speedily without using an adhesive by the arrangement of the groove lathing material 3 in the grooves 6 and 9, the application of the surface lathing material 4 on the entire of one surface and the placement of a cement mortar material.

Furthermore, the arrangements of the reinforcing materials 8 and 28 in the foamed synthetic resin plate layer 2 and the like eliminate the need of the formation of a complicated mortar backing used to form the mortar layer and make it possible to form floor materials, framework walls and the like firmly though the reinforcing materials are light weight, as well as simply and speedily.

DESCRIPTION OF THE PREFERRED EMBODIMENTS

Figure 1:
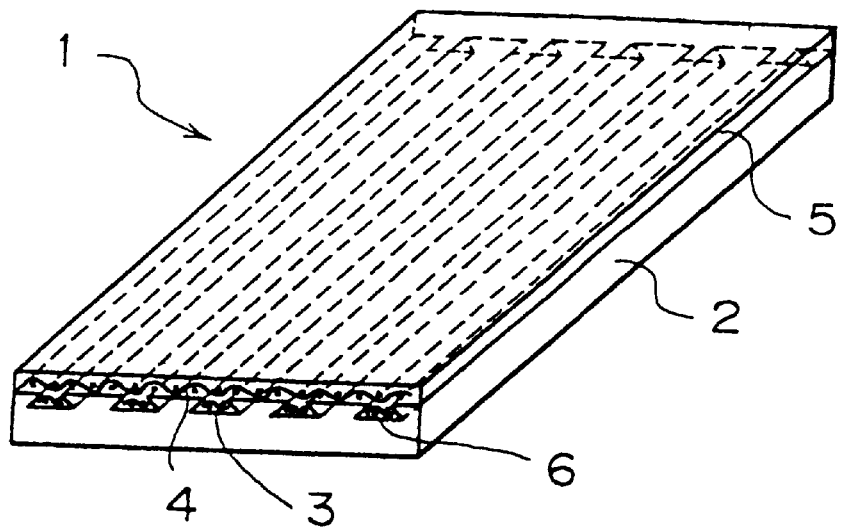
FIG. 1 is a perspective view showing a schematic structure of a first embodiment according to the present invention.
Figure 2:
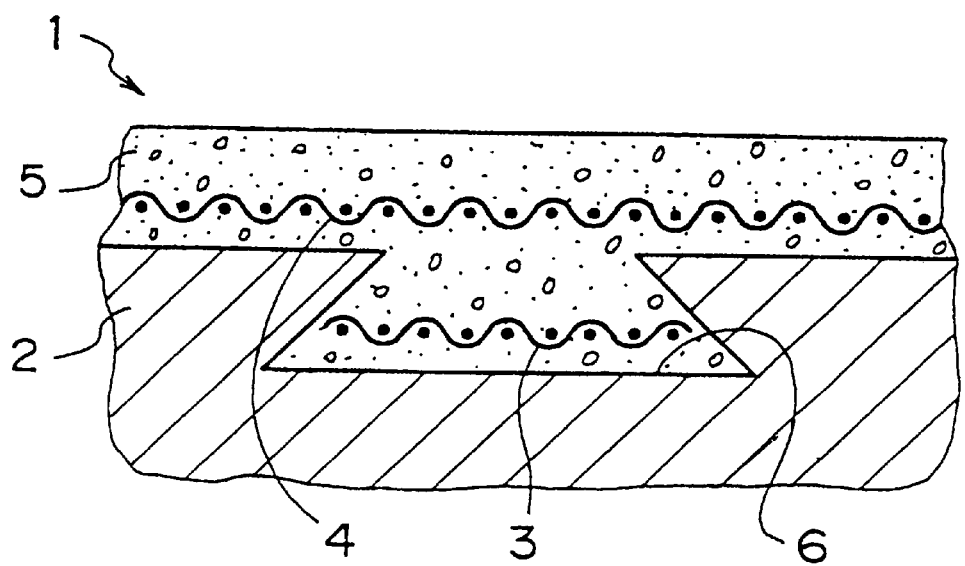
FIG. 2 an enlarged sectional view schematically showing the surrounding of a groove of the first embodiment according to the present invention.
Figure 3:
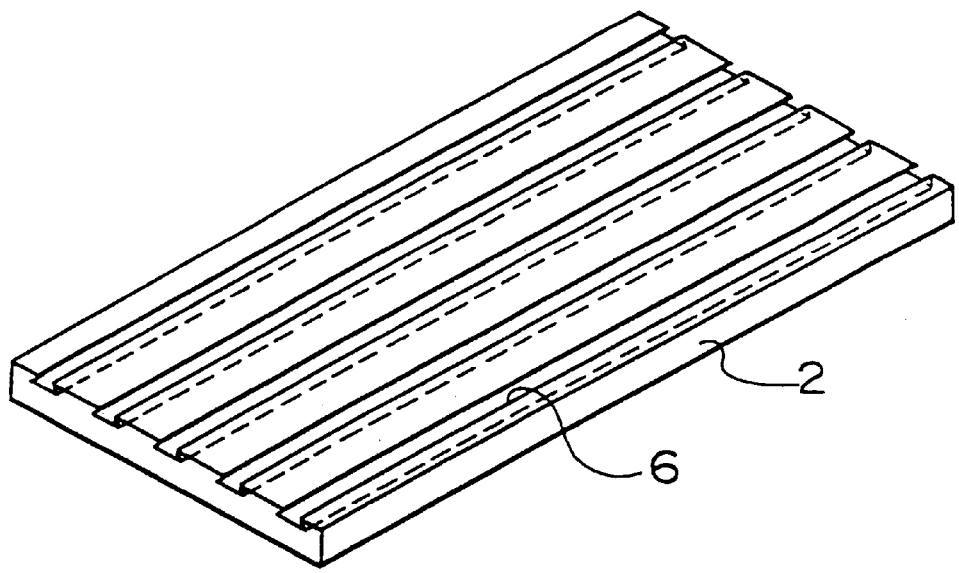
FIG. 3 is a perspective view showing a whole foamed synthetic resin plate layer of the first embodiment according to the present invention.

An embodiment of the present invention will be hereinafter explained with reference to the drawings. The symbol 1 in a first embodiment shown in FIGS. 1 to 5 represents a composite building material produced by combining a foamed synthetic resin plate layer with a concrete material, the composite building material constituting building materials, e.g., framework wall materials, floor materials or roofing materials, used in various buildings, e.g., general houses and residences The composite building material 1, as shown in FIGS. 1 and 2, has the following structure. It has, for instance, an about 1800-mm-long, 900-mm-wide and 100-mm-high rectangular thin plate form. Plural concave grooves 6 of almost an dovetail groove shape having a narrow opening and spreading backward are formed on one surface of a plate material layer 2 made of a foamed synthetic resin, e.g., foamed styrene (see FIG. 3). In the inner part of each groove 6, a groove lathing material 3 which is made of a metal wire net is disposed and a surface lathing material 4 made of a metal wire net sheet which is used as a mortar backing for framework walls, roofing materials or floor materials is stretched over all of that surface so as to cover the opening of each groove 6. A cement mortar layer 5 is laminated in a manner that it buries both lathing materials 3 and 4 simultaneously.

Figure 5A:
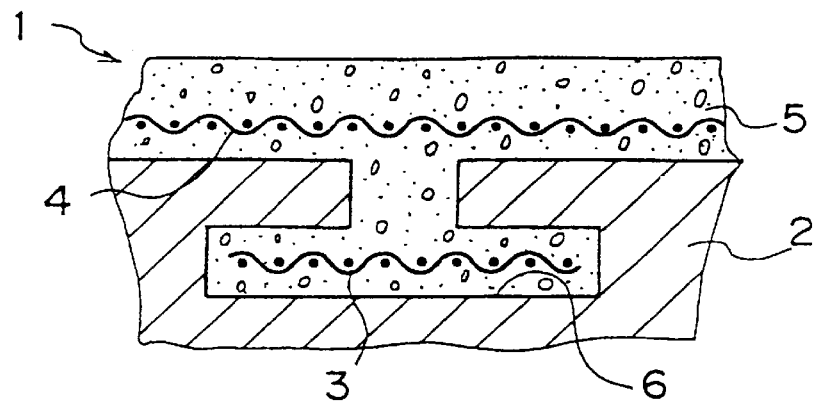
FIG. 5 shows other schematic structures of the first embodiment according to the present invention, in which (a) is an enlarged sectional view showing the surrounding of an inverse T-shaped groove, (b) an enlarged sectional view showing the surrounding of a groove having a sectionally circular form and (c) an enlarged sectional view showing the surrounding of an inverse V-shaped groove.

The groove 6 of the foamed synthetic resin plate layer 2 may be made concavely in almost an inverse T-shaped form as shown in FIG. 5(a) to increase the area of the inner part of the groove so that the surface area of the groove lathing material 3 disposed in the inner part of the groove 6 is increased thereby further improving a function in preventing disconnection caused by the peeling force of the cement mortar layer 5.

Figure 5B:
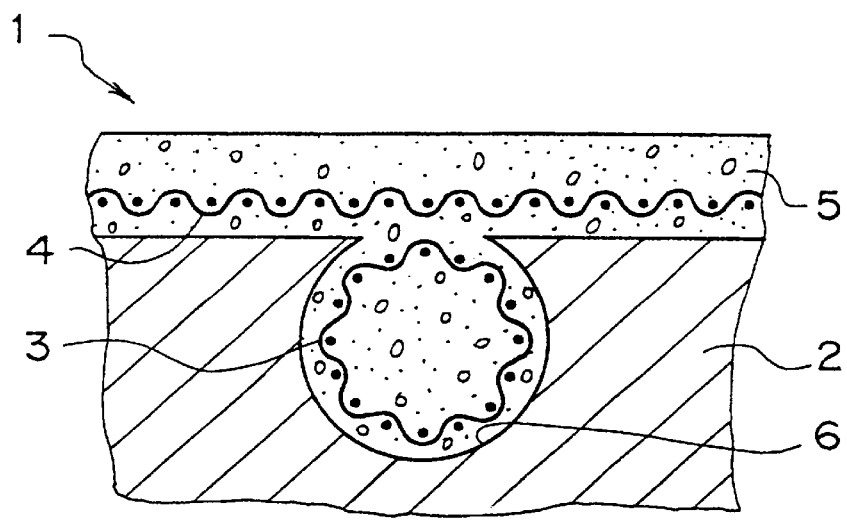

The groove 6 of the foamed synthetic resin plate layer 2 may be made concavely in almost a sectionally circular form as shown in FIG. 5(b) so that the inner part of the groove is made in the form of a cylinder with a curved surface and hence the groove lathing material 3 is made in the form of a cylinder which is arranged along the peripheral wall surface of the groove 6 thereby further increasing the surface area of the groove lathing material and improving a function in preventing disconnection caused by the peeling force of the cement mortar layer 5.

Figure 5C:
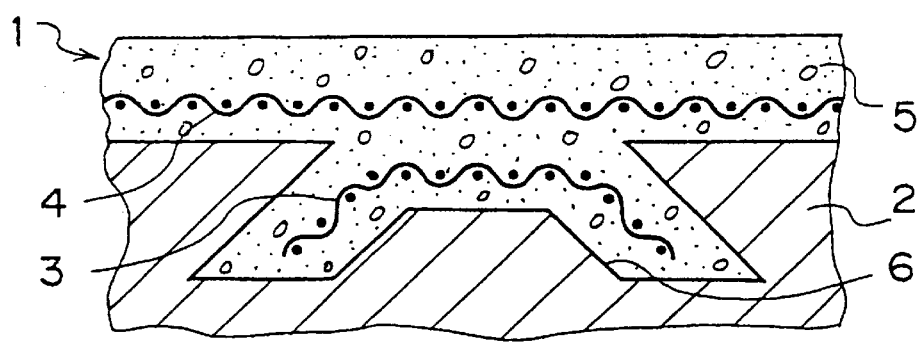

The groove 6 of the foamed synthetic resin plate layer 2 may be made concavely in almost an inverse V-shaped form as shown in FIG. 5(c) to form an inner part spreading backward and having a fork end so that the surface area of the groove lathing material 3 disposed in the inner part of the groove 6 is substantially increased thereby further improving a function in preventing disconnection caused by the peeling force of the cement mortar layer 5.

Figure 4:
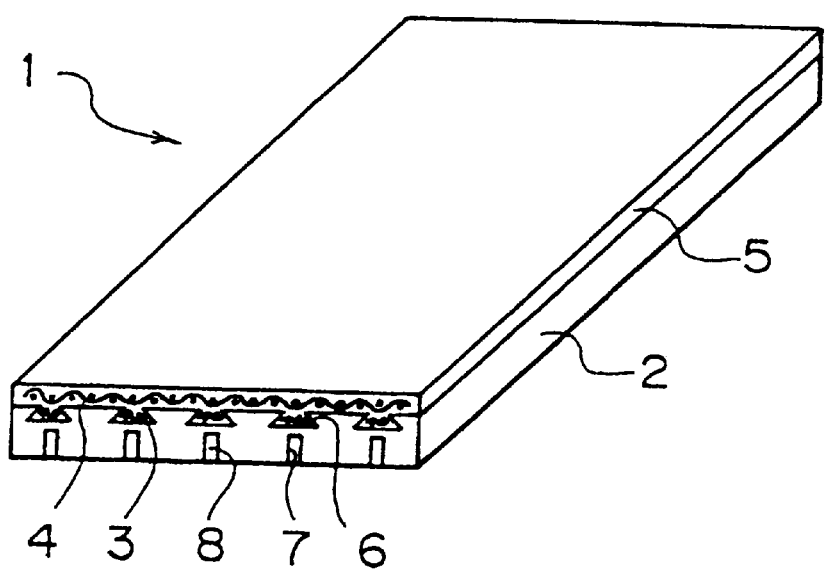
FIG. 4 is a perspective view showing other schematic structure of the first embodiment according to the first embodiment.

As shown in FIG. 4, rectangular grooves 7 having a length of about 1800 mm, a depth of about 50 mm, and a width of about 12 mm are formed, opposed to each groove 6, on the surface opposite to the surface formed with the groove 6 of the foamed synthetic resin plate layer 2. Plural reinforcing material 8 which are made in the form of a lengthy plate having a length of about 1800 mm, a width of about 50 mm, and a thickness of about 12 mm and made of, for instance, wood, concrete panel materials, rigid materials, iron materials, corrugated board materials or the like are fitted and buried in the rectangular groove 7 in a manner that its one surface having a size corresponding to the thickness of the reinforcing material 8 is exposed. The reinforcing material 8 may be buried such that it is included within the foamed synthetic resin plate layer 2.

Next, a method in an instance of a first embodiment for manufacturing the composite building material 1 produced by combining the foamed synthetic resin plate layer with the concrete material will be explained. The plural grooves 6 are formed concavely in parallel on at least one surface among the surface and backface of the foamed synthetic resin plate material. The net-like groove lathing material 3 with a size corresponding to the size of each groove 6 is disposed in each groove 6 and a cement mortar material is filled in the groove so as to bury the groove lathing material 3. The net-like surface lathing material 4 is stretched over all of that surface so as to cover the opening of each groove 6 and then a cement mortar material is further laminated to form the composite building material 1 in which the foamed synthetic resin plate layer 2 is integrated with the cement mortar material 5. Alternatively, the groove lathing material 3 may be disposed in each groove 6 and the surface lathing material 4 may be stretched over all of one surface so as to cover the opening of each groove 6 followed by laminating the cement mortar material in a manner that it buries both lathing materials 3 and 4 to form the composite building material 1 in which the foamed synthetic resin plate layer 2 is integrated with the cement mortar layer 5. In this manner, the foamed synthetic resin plate layer 2 having an heat-insulating effect is easily integrated together with the cement mortar layer 5

Figure 6A:
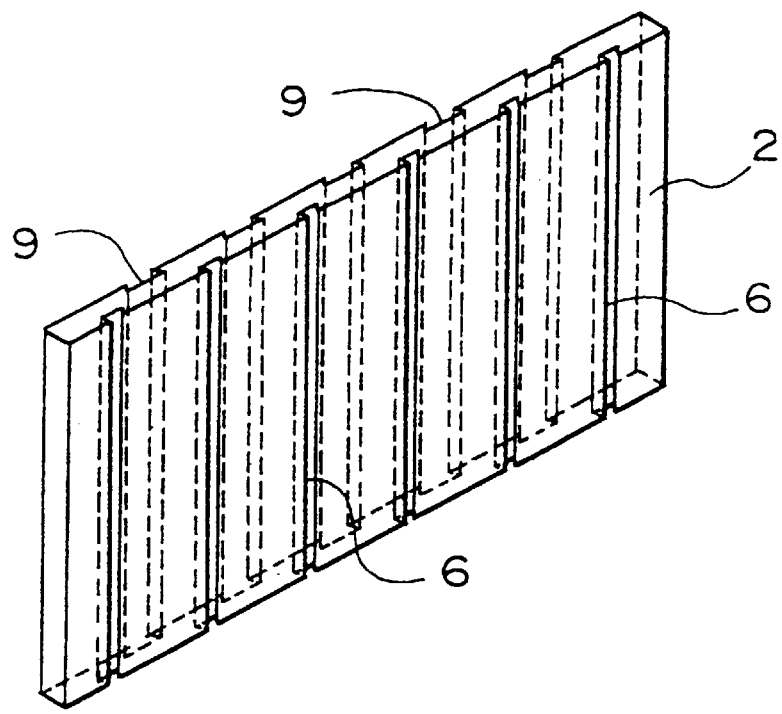
FIG. 6 is a schematic structure of a second embodiment according to the present invention, in which (a) is a perspective view of a whole foamed synthetic resin plate layer and (b) a perspective view showing the condition in which the foamed synthetic resin plate layer is sandwiched between a concrete material layer and a fire-resistant board thereby integrating these materials with each other.

FIG. 6 shows a second embodiment wherein the same structural parts as in the first embodiment are represented by the same symbols and the detailed descriptions of these parts will be omitted. In this second embodiment, as shown in FIG. 6(a), a plurality of the almost dovetail-type grooves 6 of the foamed synthetic resin plate layer 2 which is used in the first embodiment is formed over a distance of 900 mm in a lateral direction at intervals of 300 mm. Grooves 9 having an opening width wider than that of the groove 6 are formed on the surface opposite to the surface formed with the groove 6 in a manner that these grooves 9 and grooves 6 are formed in parallel, alternating each other when viewed from the side.

Figure 6B:
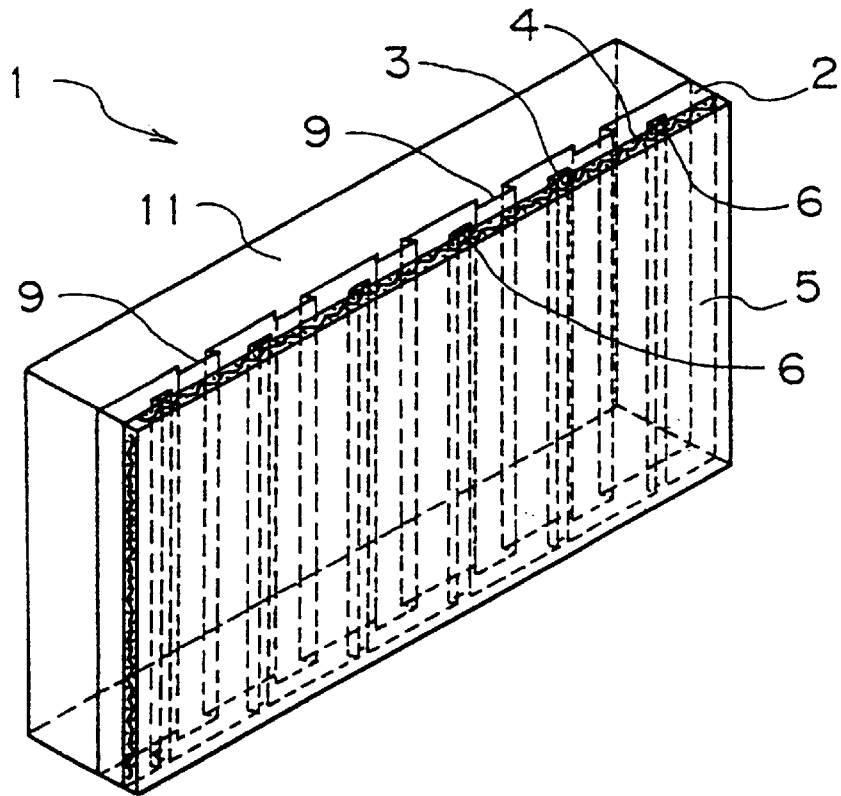

As shown in FIG. 6(b), the groove lathing material 3 is disposed in each groove 6 and the surface lathing material 4 is stretched over all of one surface so as to cover the opening of each groove 6, followed by laminating a cement mortar material to integrate the cement mortar layer 5 with the foamed synthetic resin plate layer. The resulting product is used as a form work. Specifically, the product is fixed and disposed such that the side of the groove 6 on which the cement mortar layer 5 is formed is secured and disposed as an inner material for framework walls, ceilings, footings, or the like and the side of the groove 9 is arranged as an outer material for the framework walls, ceilings, footings, or the like to place a concrete material thereby forming a concrete material layer 11. In such a structure, it is unnecessary to demount the foamed synthetic resin plate layer 2 itself used as the form work and the formed synthetic resin plate layer 2 can be utilized as a form work and as a part of framework which is supported by the concrete material layer 11 and the cement mortar layer 5. Incidentally, the cement mortar layer 5 and the concrete material layer 11 may be placed in the inner side formed with the groove lathing material 3 and the surface lathing material 4 and in the outer side respectively among both surfaces of foamed synthetic resin plate layer 2 framed at a construction site.

Figure 7:
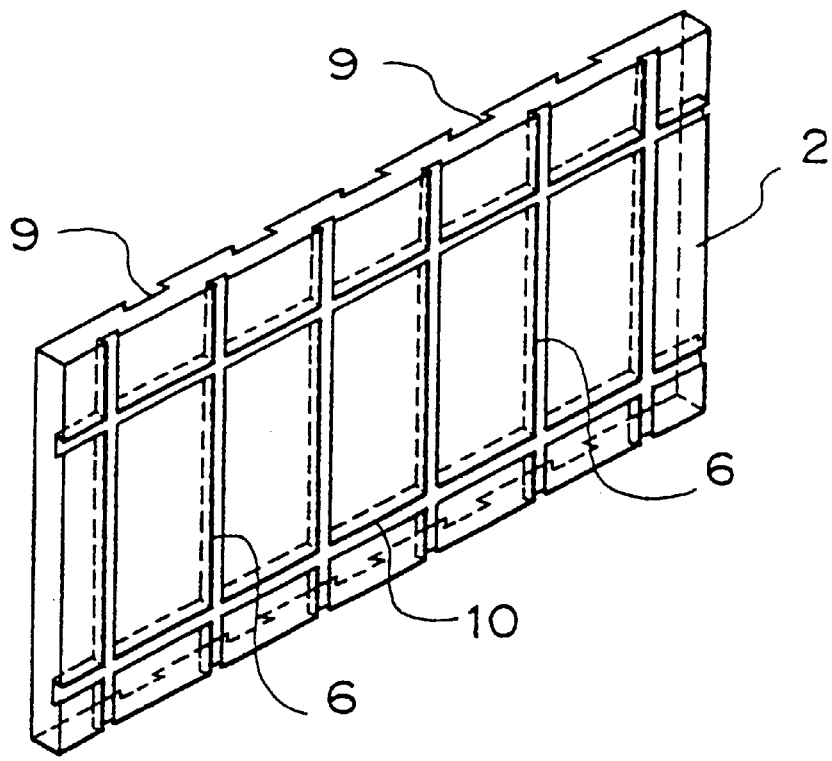
FIG. 7 is a perspective view of a whole foamed synthetic resin plate layer showing other schematic structure of the second embodiment according to the present invention.

Moreover, in the second embodiment and also in the first embodiment, as shown in FIG. 7, a pair of grooves 10 may be formed over a distance of 1800 mm in a longitudinal direction such that the pair of grooves 10 cross the groove 6 of the foamed synthetic resin plate layer 2 at a right angle.

Figure 8:
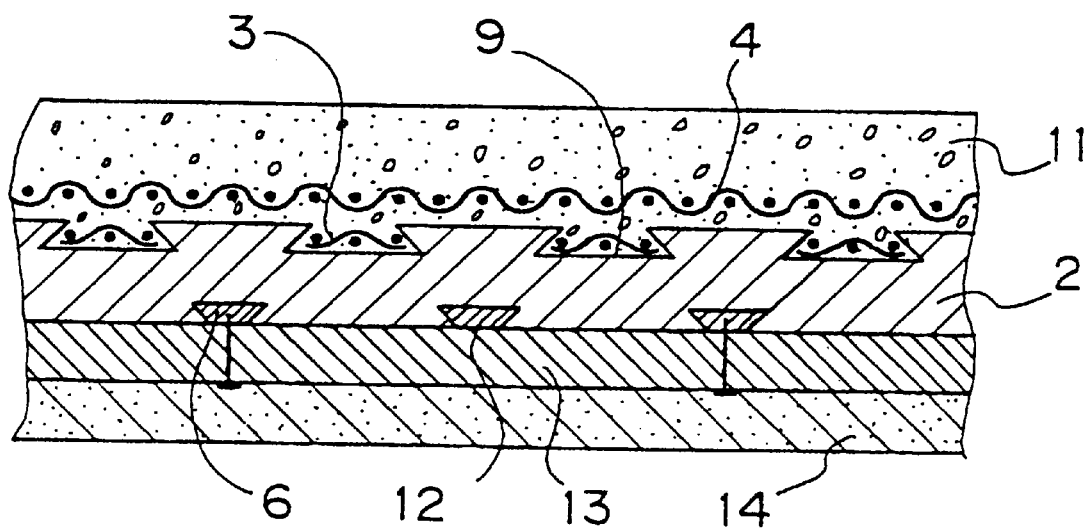
FIG. 8 shows a schematic structure of a third embodiment according to the present invention and is a sectional view showing the condition in which a chipping material is arranged in a groove and a fire resistant-board is stretched over the chipping material.

FIG. 8 shows a third embodiment wherein the same structural parts as in the first embodiment are represented by the same symbols and the detailed descriptions of these parts will be omitted. In this third embodiment, as shown in FIG. 8, a chipping material 12 is inserted into the groove 6 of the foamed synthetic resin plate layer 2, used in the first embodiment, instead of the groove lathing material 3 and cross bars 13 are then nailed on the groove 6. A fire-resistant board 14 is stretched over the cross bars 13, while the groove lathing material 3 and the surface lathing material 4 are disposed in the groove 9 formed on the opposite surface of the foamed synthetic resin plate layer 2 and a cement mortar material is filled in the groove 9 to form a concrete material layer 11. In this case, the cross bars 13 are arranged on the surface of the foamed synthetic resin plate layer 2 and the fire-resistant board 14 is secured to the cross bars 13 so as to keep the space formed by the thickness of the cross bars. In this manner, the foamed synthetic resin plate layer 2 having a heat-insulating effect can be integrated together with the concrete material layer 11, the fire-resistant board 14, and the like. Unlike the conventional method, it is unnecessary to make a mortar backing separately enabling simple construction of a framework wall at a building site.

FIGS. 9 to 13 show a fourth embodiment wherein the same structural parts as in the first embodiment are represented by the same symbols and the detailed descriptions of these parts will be omitted. In this fourth embodiment, plural lengthy and narrow plate reinforcing materials 28 made of wood, concrete panel materials, rigid materials, iron materials, preferably recycled corrugated board materials or the like may be buried in the foamed synthetic resin plate layer 2 which is a heat-insulating material constituting the composite building material 1 used in the first embodiment such that each of these reinforcing materials is included or at least one of its surfaces is exposed. This structure improves the strength of the composite building material when it is used as floor materials thereby preventing the deformation, e.g., buckling.

Figure 9:
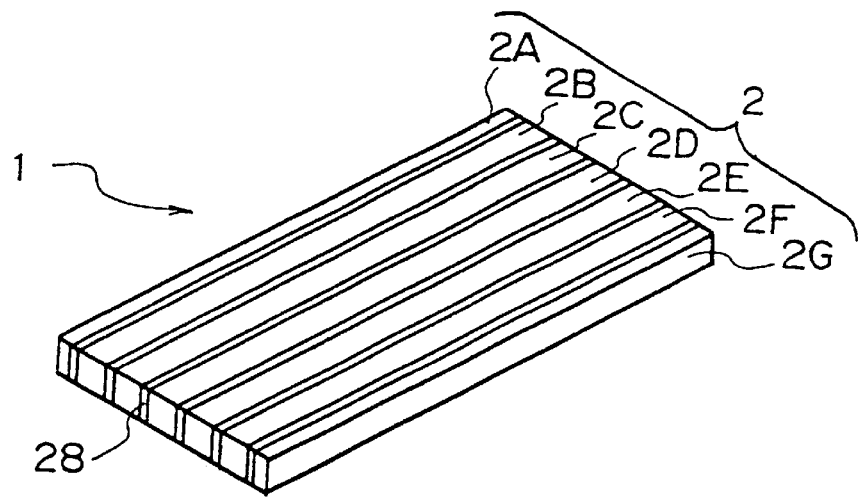
FIG. 9 is a perspective view of a composite building material showing a schematic structure of a fourth embodiment according to the present invention.
Figure 10:
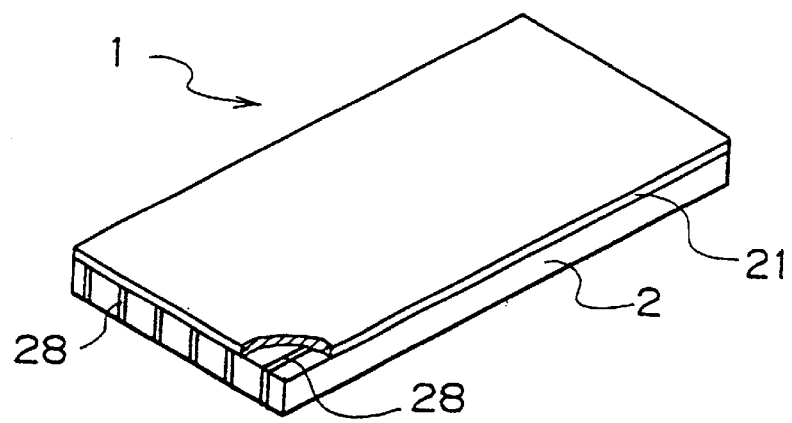
FIG. 10 is a partially broken perspective view of a composite building material showing another schematic structure of the fourth embodiment according to the present invention.

To state more concretely, as shown in FIG. 9, the foamed synthetic resin plate layer 2 is divided into plural blocks 2A, 2B, 2C, . . . and lengthy and narrow plate reinforcing materials 28 are interposed between these blocks and bonded with and secured to these blocks. The plural lengthy and narrow plate reinforcing materials 28 and the lengthy and rectangular prismatic foamed synthetic resin plate layers 2 are applied to each other alternately to integrate both materials with each other thereby forming a plate. As shown in FIG. 10, a plywood layer 21 made of, for instance, thin plate wood, concrete panel materials, rigid materials, iron materials, or corrugated board materials may be applied to any one of the surfaces of the foamed synthetic resin plate layer 2.

Figure 11:
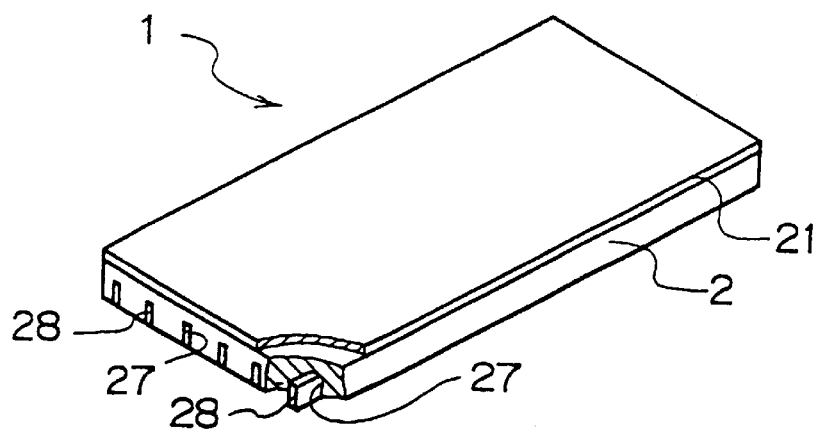
FIG. 11 is a partially broken perspective view of a composite building material showing a still another schematic structure of the fourth embodiment according to the present invention.
Figure 13:
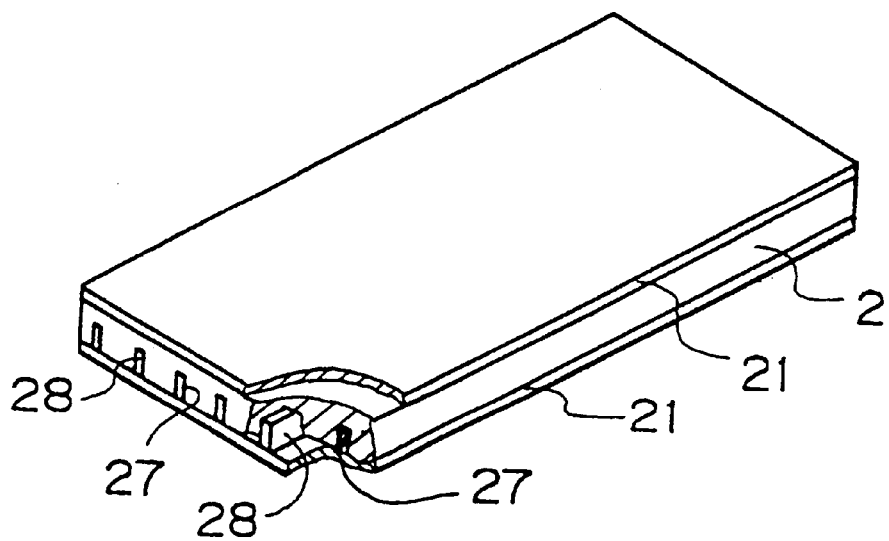
FIG. 13 is a partially broken perspective view of a composite building material showing a still further schematic structure of the fourth embodiment according to the present invention.

The following structure shown in FIG. 11 may be adopted. Specifically, plural rectangular grooves 27 having a length of about 1800 mm, a depth of about 50 mm, and a width of about 12 mm are formed on one of the surfaces of the foamed synthetic resin plate layer 2. Each of plural narrow and lengthy plate reinforcing materials 28 made of, for instance, wood, concrete panel materials, rigid materials, iron materials, or recycled corrugated board materials having a length of about 1800 mm, a width of about 50 mm, and a thickness of 12 mm corresponding to the size of the rectangular groove 27 is fitted in each of the grooves 27. The reinforcing material 28 is buried in and secured to each of the grooves 27 in a manner that one of the surfaces of the reinforcing materials 28 which one corresponds to the thickness of the reinforcing material 28 is exposed. A plywood layer 21 made of, for instance, thin plate wood, concrete panel materials, rigid materials, iron materials, or corrugated board materials may be applied to the surface of the foamed synthetic resin plate layer 2 on which no reinforcing material 28 is exposed. This plywood layer 21 may be applied to both of the surfaces of the foamed synthetic resin plate layer 2 as shown in FIG. 13.

Figure 12:
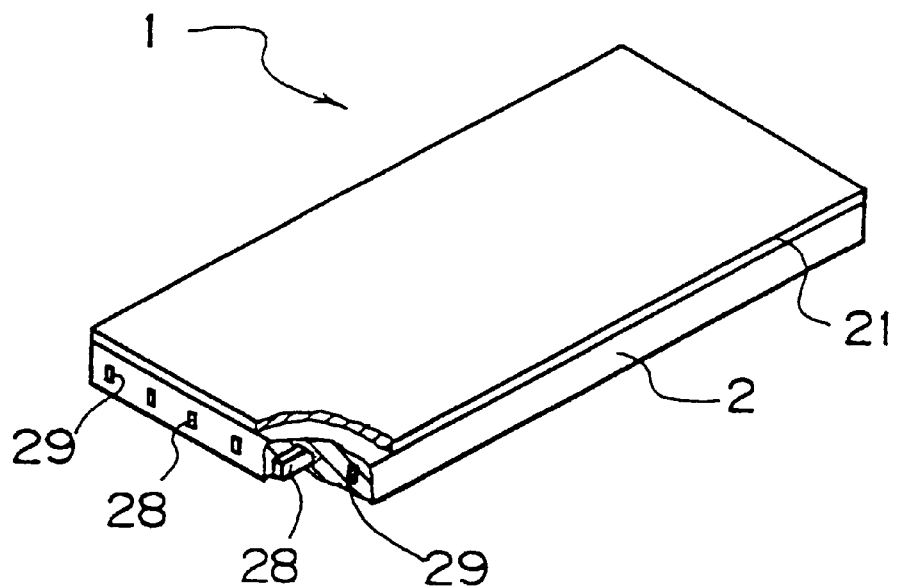
FIG. 12 is a partially broken perspective view of a composite building material showing a further schematic structure of the fourth embodiment according to the present invention.

Moreover, as shown in FIG. 12, plural lengthy and narrow plate reinforcing materials 28 are buried in the foamed synthetic resin plate layer 2 in a manner that each of these reinforcing materials 28 is included in a rectangular buried cave 29 formed within the foamed synthetic resin plate layer 2 and a plywood layer 21 made of, for instance, thin plate wood, concrete panel materials, rigid materials, iron materials, or corrugated board materials may be applied to any one of the surface of the foamed synthetic resin plate later 2 to constitute the composite building material.

According to the composite building material of the present invention, as stated above, the cement mortar layer 5 itself is more improved in the capability of bonding with the foamed synthetic resin plate layer 2 than conventional composite building materials and hence it can prevent the occurrences of exfoliations and cracks. It can also prevent buckling caused by bending stress when it is used as floor materials, framework walls or the like and enables floor materials, framework walls, and the like to be a firm and strong composite material having high strength.

Also, since the grooves 6 and 9 having the form of almost a dovetail groove, inverse T-shape or inverse V-shape or a sectionally circular form are formed in the foamed synthetic resin plate layer 2, the groove lathing material 3 is allowed to be present within a space wider than the opening width of each of the grooves 6 and 9. This serves to firm the biting holding power of the cement mortar layer 5 more strongly against the foamed synthetic resin plate layer 2 through the groove lathing material 3. Specifically, the cement mortar layer 5 each in the grooves 6 and 9 and on the foamed synthetic resin plate layer 2 is firmly united through the groove lathing material 3 and the surface lathing material 4. This structure prevents production of cracks on the cement mortar layer 5 even if external impact, vibration or the like is applied and hence keeps beautiful appearance of the surface of the building material over a long period of time.

The plural reinforcing materials 8 made of wood, concrete panel materials, rigid materials, iron materials, corrugated board materials or the like which reinforcing materials are buried in opposition to each of the grooves 6 and 9 such that each of these reinforcing materials is included or one of its surfaces is exposed can prevent the cement mortar material from being deformed by buckling caused by bending stress given to the composite building material 1.

The plural reinforcing material 28 made of wood, concrete panel materials, rigid materials, iron materials, corrugated board materials or the like which are buried such that each of these materials is included or one of its surfaces is exposed and the plywood layer 21 made of wood, concrete panel materials, rigid materials, iron materials, corrugated board materials or the like which is applied to one of the surfaces of the foamed resin material layer 2 prevent buckling caused by bending stress given to the composite building material 1 when the composite building material is used as floor materials or the like and improve the strength.

In the method for manufacturing the composite building material according to the present invention, a composite building material having high strength can be produced without using an adhesive and floor materials or framework wall materials can be produced firmly, simply and speedily.

In the method for manufacturing the composite building material according to the present invention, specifically, the foamed synthetic resin plate layer and the cement mortar material are integrated, without using an adhesive, by the arrangement of the groove lathing material 3 in the grooves 6 and 9, the application of the surface lathing material 4 on the entire of one surface of the famed synthetic resin material layer 2 and the placement of a cement mortar material. Accordingly, for instance, floor materials or framework wall materials can be produced firmly, simply and speedily, showing that the composite building material of the present invention is remarkably effective as composite building materials which can be used in many applications.

Furthermore, the arrangements of the reinforcing materials 8 and 28 and the like eliminate the need of formation of a complicated mortar backing used to form the mortar layer and make it possible to form floor materials, framework walls firmly though the reinforcing materials are light weight, as well as simply and speedily.

What is claimed is:

1. A composite building material, comprising:
    a foamed synthetic resin plate layer including a first surface, a second surface, and a plurality of concave grooves formed in at least one of the first surface and the second surface,
    a net-like groove lathing material which is completely disposed in the plurality of grooves,
    a net-like surface lathing material stretched on the at least one surface such that it covers an opening of the plurality of grooves, and
    a mortar layer filling the plurality of grooves and covering the at least one surface so as to bury both the groove lathing material and the surface lathing material.

2. The composite building material according to claim 1, wherein the plurality of grooves are formed concavely on both the first surface and the second surface, the grooves formed on the first surface each have a first opening, the grooves formed on the second surface each have a second opening, and the first opening has a width different than the width of the second opening.

3. The composite building material according to claim 2, wherein the grooves formed on the first surface and the grooves formed on the second surface are arranged alternatively in parallel.

4. The composite building material according to claim 1, wherein the plurality of grooves in the foamed synthetic resin plate layer are arranged so as to cross lengthwise and breadth wise.

5. The composite building material according to claim 1, wherein the plurality of grooves include at least one groove in one of a dovetail groove type, an inverse T-shaped type and an inverse V-shaped type and the groove lathing material is arranged in each back section of the grooves.

6. The composite building material according to claim 1, wherein the plurality of grooves include a semi-circular form and the groove lathing material is arranged semi-cylindrically adjacent a circumferential wall of each semi-circular form groove.

7. The composite building material according to claim 1, wherein the plurality of concave grooves are formed in only the first surface, the second surface is opposite the first surface and includes a plurality of secondary grooves, and wherein a reinforcing structure made of at least one of wood, concrete panel material, rigid material, iron material, and corrugated board material is arranged in at least one of the secondary grooves.

8. The composite building material of claim 7, wherein the reinforcing structure has a surface exposed through an opening in the secondary groove.

9. The composite building material of claim 7, wherein the reinforcing structure includes a first material in the secondary grooves, a second material secured to the first material, and a third material secured to the second material.

10. A composite building material, comprising:
    a foamed synthetic resin plate layer including a first surface, a second surface, and a plurality of concave grooves formed in at least one of the first surface and the second surface, wherein the grooves include an opening having an opening width;
    a net-like groove lathing material which is completely disposed in the grooves and has a groove lathing width, the groove lathing width being greater than the opening width;
    a net-like surface lathing material stretched on the at least one surface such that it covers the openings of the grooves, and
    a filling layer in the at least one groove and covering the at least one surface so as to bury both the groove lathing material and the surface lathing material.

11. The composite building material according to claim 10, wherein the grooves include a base having a base width, the base width being greater than the opening width and a width of the groove lathing material.

12. A method of manufacturing a composite material, comprising:
    forming a plurality of concave grooves in parallel on at least one of a first surface and a second surface of a foamed synthetic resin plate layer;
    arranging a net-like groove lathing material corresponding to the size of each groove completely in each groove;
    filling the groove with a cement mortar material so as to bury the groove lathing material;
    stretching a net-like surface lathing material over the one surface such that it covers an opening of each groove; and
    applying cement mortar material to encase the surface lathing material thereby integrating the foamed synthetic resin plate layer with the cement mortar material.

13. The method of claim 12, wherein forming the plurality of concave grooves includes forming the opening of each groove to an opening dimension, and wherein arranging the groove lathing material includes positioning a groove lathing material having a dimension extending generally aligned with the opening dimension which is an greater than the opening dimension in each groove.

14. The method of claim 12, wherein the steps are performed in the order recited.

15. The method for manufacturing a composite material according to claim 12, further comprising applying a further layer made of at least one of wood, concrete panel materials, rigid materials, iron materials, and corrugated board materials onto at least one of the first surface and the second surface of the foamed synthetic resin plate layer.

16. A method for manufacturing a composite material, comprising:
  forming a plurality of concave grooves in parallel on at least one of a front surface and a back face of a foamed synthetic resin plate layer;
  arranging a net-like groove lathing material in each groove such that the groove lathing material is completely within the groove;
  stretching a net-like surface lathing material over all of the at least one surface such that it covers an opening of each groove; and
  then filling the grooves with a cement mortar material so as to bury both the groove lathing material and the surface lathing material, thereby integrating the foamed synthetic resin plate layer with cement mortar material.

17. The method for manufacturing a composite material according to claim 16, further comprising alternately applying a plurality of reinforcing materials which are made in the form of a lengthy and narrow plate and made of at least one of wood, concrete panel materials, rigid materials, iron materials, and corrugated board materials and a lengthy and rectangular prismatic foamed synthetic resin material to form an integrated plate.

18. The method for manufacturing a composite material according to claim 16, further comprising burying a plurality of reinforcing materials, which are made in the form of a lengthy and narrow plate and made of at least one of wood, concrete panel materials, rigid materials, iron materials, and corrugated board materials, in the formed synthetic resin plate layer such that one of the surfaces of each reinforcing material is exposed.

19. A composite building material, comprising:
  a foamed resin layer including a first surface, a second surface, and a plurality of elongate grooves formed in at least one of the first surface and the second surface, each of the grooves having an opening which has a length and a width;
  a net-like groove lathing material completely disposed in the plurality of grooves, the groove lathing material including a segment in one of the plurality of grooves, the segment having a width which is greater than the width of the opening;
  a surface lathing material stretched over the at least one surface such that it covers the openings of the plurality of grooves; and
  a mortar layer filling the plurality of grooves and covering the at least one surface so as to encase both the groove lathing material and the surface lathing material.

* * * * *

UNITED STATES PATENT AND TRADEMARK OFFICE
CERTIFICATE OF CORRECTION

PATENT NO. : 6,305,135 B1
DATED : October 23, 2001
INVENTOR(S) : Hiroshi Inaba

It is certified that error appears in the above-identified patent and that said Letters Patent is hereby corrected as shown below:

Title page,
Item [73], under Assignee, delete "Yoshiki" and insert -- Yoshiko --, therefor.
Item [57], under ABSTRACT, insert -- and -- after "layer," also delete "material, a" and insert -- material. A --, therefor.

Column 1,
Line 26, delete "include" and insert -- includes --, therefor.
Line 40, delete "solves" and insert -- dissolves --, therefor.

Column 2,
Line 54, insert a space between "invention," and "plural".

Column 3,
Line 67, insert -- . -- after "strength".

Column 5,
Line 16, insert -- . -- after "residences".

Column 6,
Line 32, insert -- . -- after "layer 5".

Column 9,
Line 57, delete "breadth wise" and insert -- breadthwise --, therefor.

Column 10,
Line 50, insert -- a --, after "applying".
Line 58, delete "an" after "which is".

Signed and Sealed this

Twenty-first Day of May, 2002

*Attest:*

*Attesting Officer*

JAMES E. ROGAN
*Director of the United States Patent and Trademark Office*